UNITED STATES PATENT OFFICE.

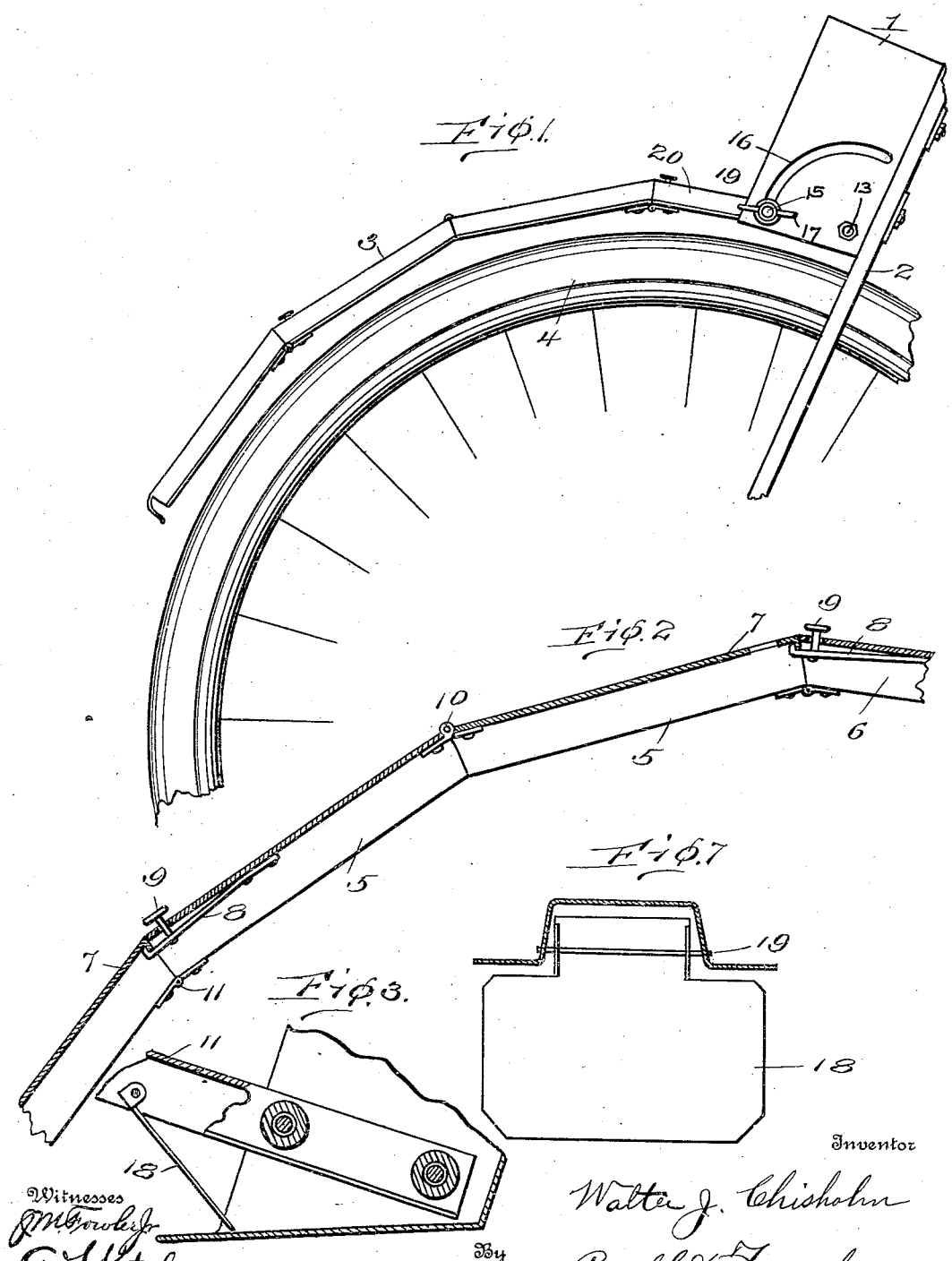

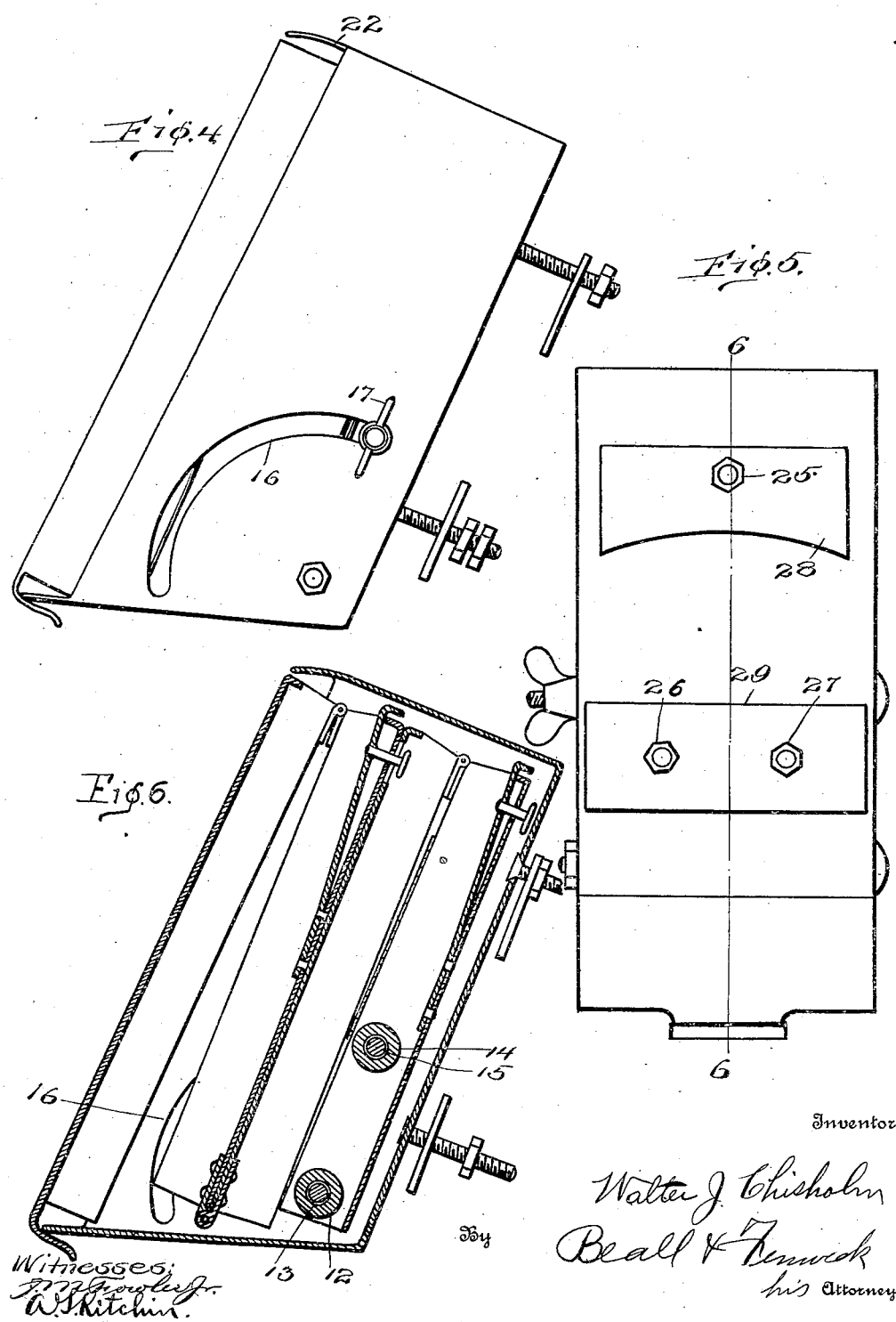

WALTER J. CHISHOLM, OF HOUSTON, TEXAS.

MUD-GUARD.

941,228.

Specification of Letters Patent.

Patented Nov. 23, 1909.

Application filed June 8, 1909. Serial No. 500,825.

*To all whom it may concern:*

Be it known that I, WALTER J. CHISHOLM, a citizen of the United States, residing at Houston, in the county of Harris and State of Texas, have invented certain new and useful Improvements in Mud-Guards, of which the following is a specification.

This invention relates to improvements in mud guards, and particularly to mud guards for bicycle wheels and the like, and has for an object the arrangement of means for collapsing or folding the mud guard into a small space when not in use.

Another object of the invention is the arrangement of a mud guard with a housing and a plurality of sections adapted to be folded into said housing and clamped therein when not in use.

A further object of the invention is the arrangement of a folding mud guard with catches for holding the guard in an extended position, and associated with a housing for receiving the sections when folded, and means for preventing foreign matter from entering the housing while the guard is extended.

With these and other objects in view the invention comprises certain novel constructions, combinations and arrangement of parts as will be hereinafter more fully described and claimed.

In the accompanying drawings: Figure 1 is a side elevation of the invention as applied. Fig. 2 is a section through several of the sections of the guard in an extended position. Fig. 3 is a fragmentary sectional view of the housing and some of the sections of the guard, together with means for preventing foreign matter from entering the housing. Fig. 4 is a side elevation of the complete guard in a folded condition. Fig. 5 is a rear view of the structure shown in Fig. 4. Fig. 6 is a section through Fig. 5, approximately on line 6—6. Fig. 7 is a sectional view through one of the sections of the guard showing a fender pivotally mounted therein.

Referring to the accompanying drawings by numerals, 1 indicates a housing secured to the upper rear forks 2 of the bicycle for accommodating a guard proper 3, which when used extends over the wheel as 4, for catching any mud or foreign matter thrown therefrom. The mud guard proper 3 is formed in a plurality of sections 5 and 6. Sections 5 are formed with flanges or extensions 7, while sections 6 are formed with catches 8 which hook over flanges 7 for holding the sections in an extended position, as shown in Fig. 1. A thumb piece 9 is provided for catches 8 for releasing the same from engagement with flanges 7, catches 8 being made from springy material. The sections 5 and 6 are connected by a hinge 10 on their upper side between catches 8, and are hinged together at 11 immediately below catches 9, so as to permit free folding of the sections when the catches have been disengaged. The first section 6 has secured thereto a tubular member 12 through which a securing bolt 13 is passed for holding the section, and in fact the entire guard 3, in connection with housing 1. Bolt 13 passes entirely through tubular member 12 and housing 1. The first section 6 is also provided with a second tubular member 14, through which an adjusting bolt 15 is passed. Adjusting bolt 15 is also passed through housing 1, and is designed to operate in slots 16—16. A nut 17, preferably in the form of a wing nut, is provided for tightening bolt 15 in position, so as to clamp the same against housing 1, and hold the first section 6 at any desired angle for regulating the angle of the entire guard 3. When guard 3 has been raised so that the first section 6 will be above the bottom of housing 1, a pivotally mounted fender 18 will prevent any mud from entering housing 1. The fender 18 is mounted upon a shaft 19 that is passed through a raised portion 20 of the first section 6. The bottom or inner edge of the fender 18 is designed to be continuously in engagement with the floor 21 of housing 1, so that when the guard proper 3 has been lowered to its extreme position, as shown in Fig. 1, the fender will be lying flat against the bottom of the housing, and upon the upward swinging movement of the guard proper fender 18 will be correspondingly moved so that any dirt or mud will be prevented from packing in the lower part of housing 1, and thus make it inconvenient for folding sections 5 and 6 therein, as shown in Fig. 6. The last section 5 is designed to act as a lid for housing 1, and in order to properly hold the same in position housing 1 is formed with an over-hanging member 22 which is preferably of springy material, beneath which the ends of section 5 snap. The lower end of the last section 5 is formed with an extension 23 which is designed to fit over extension 24 projecting from floor 21. When it is desired to fold the sections 5 and 6 into housing 1, thumb nut 17 is loosened. The thumb piece 9 on the first section 6 is depressed for loosening catch 8. The first section 6 is then moved pivotally into housing 1, and then the first section 5. The second section 6 is then partially moved into housing 1, and the catch 8 thereon released, after which the entire section is forced into housing 1, followed by the last section 5 which acts as a cover. After all of the sections have been folded into housing 1, as shown in Fig. 6, thumb nut 17 is tightened, which will hold the sections in the housing. The thumb nut 17 is assisted in holding the sections in the housing by the overhanging member 22, and also by members 23 and 24.

Housing 1 is provided with a plurality of bolts 25, 26 and 27, which are provided with washers 28 and 29. Washers 28 and 29 are adapted to engage the top rear forks 2 of the bicycle, and be clamped against the same by suitable nuts on bolts 25, 26, and 27. By this arrangement of clamping means and by the particular arrangement of means for holding the guard proper 3 in any desired elevation the entire mud guard may be placed in position, and properly surround the wheel, regardless of the angle at which the rear forks 2 may be positioned.

What I claim is:

1. In a device of the character described, a housing, a guard proper pivotally connected to said housing, and means for clamping said guard proper in said housing when said guard proper is not in use.

2. In a device of the character described, a housing, a folding guard proper, means for holding the parts of said folding guard proper in an extended position, and means for holding said guard proper at any desired angle in respect to said housing.

3. In a device of the character described, a housing, a folding guard pivotally connected with said housing, said folding guard being formed in a plurality of sections, catches for holding said sections in an extended position, and a bodily movable bolt engaging said housing for varying the angle of said guard in relation to said housing.

4. In a device of the character described, a housing formed with a plurality of slots therein, a folding guard proper pivotally mounted to said housing, a bolt passing through said housing and adapted to move in said slots, said bolt being pivotally connected with said guard proper, and means for clamping said bolt to said housing at any point along said slot for varying the angle of said guard in respect to said housing.

5. In a device of the character described, a housing, a folding guard proper adapted to be folded in said housing when not in use, and a fender for preventing foreign matter from entering said housing when said guard proper is in use.

6. In a device of the character described, a housing, a folding guard proper adapted to be folded in said housing, said folding guard proper being formed in sections and hinged together, each alternate section being formed with a catch for holding said sections in an extended position when in use, and means for holding said sections in said housing when said guard proper is not in use.

In testimony whereof I affix my signature in presence of two witnesses.

WALTER J. CHISHOLM.

Witnesses:
   E. N. MILLS,
   W. E. MILLS.